(12) United States Patent
Zech (10) Patent No.: US 12,485,958 B2
(45) Date of Patent: Dec. 2, 2025

(54) FEEDBACK CONTROL SYSTEM AND STEERING GEAR BOX FOR FINAL STEERING CONTROL OF AN AUTONOMOUS VEHICLE

(71) Applicant: Torc Robotics, Inc., Blacksburg, VA (US)

(72) Inventor: Kurt Zech, Austin, TX (US)

(73) Assignee: TORC Robotics, Inc., Blacksburg, VA (US)

( * ) Notice: Subject to any disclaimer, the term of this patent is extended or adjusted under 35 U.S.C. 154(b) by 156 days.

(21) Appl. No.: 18/470,248

(22) Filed: Sep. 19, 2023

(65) Prior Publication Data

US 2025/0091640 A1    Mar. 20, 2025

(51) Int. Cl.
*B62D 5/04* (2006.01)
*B62D 5/06* (2006.01)
*B62D 6/00* (2006.01)
*B62D 15/02* (2006.01)

(52) U.S. Cl.
CPC ............. *B62D 5/046* (2013.01); *B62D 5/062* (2013.01); *B62D 15/025* (2013.01); *B62D 6/002* (2013.01)

(58) Field of Classification Search
None
See application file for complete search history.

(56) References Cited

U.S. PATENT DOCUMENTS

| | | |
|---|---|---|
| 4,454,819 A | 6/1984 | Cuylits et al. |
| 4,541,592 A | 9/1985 | Moll |
| 5,006,988 A | 4/1991 | Borenstein et al. |
| 5,375,059 A | 12/1994 | Kyrtsos et al. |
| 5,548,516 A | 8/1996 | Gudat et al. |
| 5,747,683 A | 5/1998 | Gerum et al. |
| 5,758,298 A | 5/1998 | Guldner |
| 6,134,486 A | 10/2000 | Kanayama |
| 6,138,787 A * | 10/2000 | Miotto .............. B63H 25/24  280/771 |
| 6,608,589 B1 | 8/2003 | Devereux et al. |
| 6,751,535 B2 | 6/2004 | Mori |
| 7,082,350 B2 | 7/2006 | Skoog |
| 7,510,038 B2 | 3/2009 | Kaufmann et al. |
| 7,539,557 B2 | 5/2009 | Yamauchi |
| 7,729,857 B2 | 6/2010 | Mudalige et al. |
| 7,775,174 B1 | 8/2010 | Humphreys et al. |

(Continued)

FOREIGN PATENT DOCUMENTS

| | | | |
|---|---|---|---|
| CA | 2210392 A1 * | 8/1996 | ............... B62D 5/04 |
| CN | 108791488 A * | 11/2018 | ............. B62D 11/04 |

(Continued)

*Primary Examiner* — Kevin R Steckbauer
(74) *Attorney, Agent, or Firm* — Armstrong Teasdale LLP (57) ABSTRACT

A steering control system and method of controlling a vehicle using the steering control system are disclosed. The final steering control system is configured to receive a plurality of critically damped outputs generated by a plurality of critically damped control loops, and generate, based on the plurality of critically damped outputs, a combined critically damped output. A steering gear box is communicatively coupled with a final steering control system and configured to receive the combined critically damped output from the final steering control system to control a steering angle of a vehicle based on the combined critically damped output.

18 Claims, 7 Drawing Sheets

(56) References Cited

U.S. PATENT DOCUMENTS

| | | |
|---|---|---|
| 8,180,513 B2 | 5/2012 | Wang |
| 8,468,108 B1 | 6/2013 | Blake |
| 8,527,113 B2 | 9/2013 | Yamauchi et al. |
| 8,825,302 B2 | 9/2014 | Schmidt |
| 8,839,891 B2 * | 9/2014 | Kaloust ............... B62D 61/10 180/6.48 |
| 8,880,287 B2 | 11/2014 | Lee et al. |
| 9,063,549 B1 | 6/2015 | Pennecot et al. |
| 9,128,190 B1 | 9/2015 | Ulrich et al. |
| 9,144,188 B2 | 9/2015 | Bover Trobat |
| 9,168,924 B2 | 10/2015 | Lee et al. |
| 9,315,212 B1 | 4/2016 | Kyrtsos et al. |
| 9,592,851 B2 | 3/2017 | Lavoie et al. |
| 9,616,928 B2 | 4/2017 | Lavoie et al. |
| 9,669,677 B2 | 6/2017 | Hrovat et al. |
| 9,751,558 B2 | 9/2017 | Lavoie et al. |
| 9,937,795 B2 | 4/2018 | Konet et al. |
| 10,029,725 B2 | 7/2018 | Schulz et al. |
| 10,060,093 B2 | 8/2018 | Linner |
| 10,082,562 B1 | 9/2018 | Abari et al. |
| 10,104,822 B2 | 10/2018 | Couchman |
| 10,118,639 B2 * | 11/2018 | Zhu ............... B62D 6/002 |
| 10,160,484 B2 | 12/2018 | Lee et al. |
| 10,222,477 B2 | 3/2019 | Keilaf et al. |
| 10,300,783 B2 | 5/2019 | Calleija et al. |
| 10,328,577 B2 | 6/2019 | Lawrence et al. |
| 10,384,501 B2 | 8/2019 | Rothschild |
| 10,386,489 B2 | 8/2019 | Albelo et al. |
| 10,533,409 B2 | 1/2020 | Benson et al. |
| 10,549,752 B2 | 2/2020 | Zhu et al. |
| 10,559,980 B2 | 2/2020 | Kurs et al. |
| 10,571,561 B2 | 2/2020 | Zorea et al. |
| 10,578,075 B2 | 3/2020 | Sheldon-Coulson et al. |
| 10,599,153 B2 | 3/2020 | Hoerster et al. |
| 10,613,539 B2 | 4/2020 | Falconer et al. |
| 10,689,102 B2 | 6/2020 | Tovkach et al. |
| 10,712,431 B1 | 7/2020 | Angus et al. |
| 10,720,748 B2 | 7/2020 | Villeneuve et al. |
| 10,723,379 B2 * | 7/2020 | Naik ............... B62D 5/006 |
| 10,800,427 B2 | 10/2020 | Goldberg et al. |
| 10,809,381 B2 | 10/2020 | Angus et al. |
| 10,829,149 B1 | 11/2020 | Garimella et al. |
| 10,850,728 B2 | 12/2020 | Shalev-Shwartz et al. |
| 10,864,940 B2 * | 12/2020 | Naik ............... B62D 6/008 |
| 10,875,617 B2 | 12/2020 | Gai et al. |
| 10,911,028 B1 | 2/2021 | Flewelling |
| 10,933,933 B2 | 3/2021 | Wells et al. |
| 10,988,173 B2 | 4/2021 | Goering et al. |
| 11,029,690 B2 * | 6/2021 | Noess ............... G05D 1/0223 |
| 11,061,201 B2 | 7/2021 | Zhou et al. |
| 11,073,622 B2 | 7/2021 | Cohen |
| 11,079,764 B2 | 8/2021 | Nister et al. |
| 11,092,801 B2 | 8/2021 | Zhou et al. |
| 11,097,775 B2 | 8/2021 | Fay, II |
| 11,105,645 B2 | 8/2021 | Glazberg et al. |
| 11,167,795 B2 | 11/2021 | Kalabic et al. |
| 11,181,917 B2 | 11/2021 | Zhu |
| 11,192,548 B2 | 12/2021 | Magolan et al. |
| 11,249,189 B2 | 2/2022 | Raring et al. |
| 11,420,695 B2 | 8/2022 | Viele et al. |
| 11,433,942 B2 | 9/2022 | Fazekas et al. |
| 11,465,650 B2 | 10/2022 | Saxena et al. |
| 11,479,265 B2 | 10/2022 | Zhu |
| 11,543,821 B2 | 1/2023 | Corbett et al. |
| 11,567,505 B2 | 1/2023 | Chowdhury et al. |
| 11,608,088 B2 | 3/2023 | Karve |
| 11,608,089 B2 | 3/2023 | Takhmar et al. |
| 11,641,861 B2 | 5/2023 | Höhener et al. |
| 11,644,537 B2 | 5/2023 | Millischer et al. |
| 2005/0114023 A1 | 5/2005 | Williamson et al. |
| 2008/0119994 A1 | 5/2008 | Kameyama |
| 2010/0090453 A1 | 4/2010 | Bortoli |
| 2013/0245892 A1 * | 9/2013 | Chen ............... B62D 5/093 701/42 |
| 2014/0343795 A1 | 11/2014 | Lavoie |
| 2015/0196439 A1 | 7/2015 | Osipov et al. |
| 2017/0341648 A1 | 11/2017 | Sanma et al. |
| 2018/0001927 A1 | 1/2018 | Howing et al. |
| 2018/0186403 A1 * | 7/2018 | Zhu ............... G05B 19/402 |
| 2020/0023893 A1 * | 1/2020 | Naik ............... B62D 5/0466 |
| 2020/0023894 A1 * | 1/2020 | Naik ............... B62D 6/008 |
| 2020/0070888 A1 | 3/2020 | Millsap et al. |
| 2020/0205338 A1 | 7/2020 | Zeiler et al. |
| 2020/0216079 A1 | 7/2020 | Mahajan |
| 2020/0231206 A1 | 7/2020 | Tsubaki |
| 2020/0383580 A1 | 12/2020 | Shouldice et al. |
| 2021/0041538 A1 | 2/2021 | Zheng et al. |
| 2021/0053616 A1 * | 2/2021 | Funke ............... G05D 1/0088 |
| 2021/0070356 A1 | 3/2021 | Lyzen et al. |
| 2021/0080949 A1 | 3/2021 | Takeda et al. |
| 2021/0114424 A1 | 4/2021 | Jamison |
| 2021/0214916 A1 | 7/2021 | Kodaira et al. |
| 2021/0356549 A1 | 11/2021 | Dowski et al. |
| 2021/0405202 A1 | 12/2021 | Barber et al. |
| 2022/0001893 A1 | 1/2022 | Tartz |
| 2022/0063672 A1 | 3/2022 | Corbett et al. |
| 2022/0063758 A1 | 3/2022 | Corbett et al. |
| 2022/0066197 A1 | 3/2022 | Almeida Loya et al. |
| 2022/0091235 A1 | 3/2022 | Lu et al. |
| 2022/0111895 A1 | 4/2022 | Schumann et al. |
| 2022/0126917 A1 | 4/2022 | Helfrich et al. |
| 2022/0137396 A1 | 5/2022 | Lee et al. |
| 2022/0146637 A1 | 5/2022 | Lu et al. |
| 2022/0161820 A1 | 5/2022 | Major et al. |
| 2022/0204339 A1 | 6/2022 | Lee et al. |
| 2022/0206285 A1 | 6/2022 | Lee et al. |
| 2022/0206286 A1 | 6/2022 | Lee et al. |
| 2022/0266852 A1 | 8/2022 | Khayyer |
| 2022/0281473 A1 | 9/2022 | LaBarbera et al. |
| 2022/0281478 A1 | 9/2022 | Shedge et al. |
| 2022/0340137 A1 | 10/2022 | Ollis et al. |
| 2022/0340138 A1 | 10/2022 | Seegmiller et al. |
| 2022/0340161 A1 | 10/2022 | Karve |
| 2022/0342035 A1 | 10/2022 | Smith |
| 2022/0348219 A1 | 11/2022 | Kim |
| 2022/0363092 A1 | 11/2022 | Copeland |
| 2022/0390572 A1 | 12/2022 | Russell et al. |
| 2023/0011457 A1 | 1/2023 | Lu et al. |
| 2023/0101825 A1 | 3/2023 | Adams |
| 2023/0166729 A1 | 6/2023 | Shalev-Shwartz et al. |
| 2024/0059350 A1 * | 2/2024 | Sun ............... G05B 6/02 |
| 2025/0042466 A1 * | 2/2025 | Do ............... B62D 6/002 |
| 2025/0091640 A1 * | 3/2025 | Zech ............... B62D 5/062 |

FOREIGN PATENT DOCUMENTS

| | | | | |
|---|---|---|---|---|
| CN | 109017975 A | * | 12/2018 | ............... B62D 6/00 |
| CN | 109416539 A | * | 3/2019 | ............... B62D 6/02 |
| CN | 109808764 A | * | 5/2019 | |
| CN | 110228524 A | * | 9/2019 | ............... B62D 5/046 |
| CN | 110341785 A | * | 10/2019 | ............... B62D 5/0409 |
| CN | 110745177 A | * | 2/2020 | ............... B62D 5/005 |
| CN | 110745178 A | * | 2/2020 | ............... B62D 5/006 |
| CN | 111315640 A | * | 6/2020 | ............... B62D 15/025 |
| CN | 110228524 B | * | 9/2021 | ............... B62D 1/283 |
| CN | 109416539 B | * | 12/2021 | ............... B62D 15/0265 |
| CN | 110341785 B | * | 5/2022 | ............... B62D 5/0409 |
| CN | 109808764 B | * | 5/2024 | |
| CN | 118701166 A | * | 9/2024 | ............... B62D 5/0481 |
| CN | 118833288 A | * | 10/2024 | ............... B62D 6/00 |
| CN | 118850170 A | * | 10/2024 | ............... B62D 15/021 |
| CN | 118907226 A | * | 11/2024 | ............... B62D 15/024 |
| CN | 119117082 A | * | 12/2024 | ............... B62D 6/008 |
| CN | 119142337 A | * | 12/2024 | ............... B60W 10/20 |
| DE | 102019108996 A1 | * | 10/2019 | ............... B62D 5/046 |
| DE | 102019119572 A1 | * | 1/2020 | ............... B62D 5/006 |
| DE | 102019119798 A1 | * | 1/2020 | ............... B62D 5/005 |
| EP | 2173599 B1 | * | 10/2011 | ............... B62D 13/00 |
| EP | 3514651 A1 | * | 7/2019 | ............... B62D 11/04 |
| EP | 3350661 B1 | * | 5/2021 | ............... B62D 15/0265 |
| JP | H10512829 A | * | 12/1998 | ............... B64C 13/506 |
| JP | 2019505423 A | * | 2/2019 | ............... B62D 15/0265 |
| JP | 6668375 B2 | * | 3/2020 | ............... B62D 6/002 |

(56) References Cited

FOREIGN PATENT DOCUMENTS

| | | | | |
|---|---|---|---|---|
| TW | 201036855 A | * | 10/2010 | |
| WO | WO-9622908 A1 | * | 8/1996 | ............. B63H 25/24 |
| WO | WO-2022144552 A1 | * | 7/2022 | ............... B62D 6/00 |

* cited by examiner

FEEDBACK CONTROL SYSTEM AND STEERING GEAR BOX FOR FINAL STEERING CONTROL OF AN AUTONOMOUS VEHICLE

TECHNICAL FIELD

The field of the disclosure relates generally to an autonomous vehicle and, more specifically, to a feedback control system and a steering gear box for final steering control of an autonomous vehicle to reduce or eliminate oscillations in the autonomous vehicle.

BACKGROUND OF THE INVENTION

A vehicle such as a tractor trailer comprises a cab that is connected to a single trailer. The cab or truck transports the trailer to a desired location. The combination of the vehicle and trailer may have a length of approximately 50 feet (15.2 meters). The vehicle may be connected to two trailers referred to as tandem trailers. When tandem trailers are used, a first trailer is connected to the vehicle and the second trailer is connected behind the first trailer. Whether single or tandem trailers are transported by the vehicle, it is important to maintain alignment between and among the vehicle and trailer or trailers. The desired alignment will improve stability and operability of the vehicle-trailer combination, as they move along the road.

External factors such as traffic/other vehicles, weather conditions, such as wind for example, as well as road conditions including wet/icy roads or objects on the road require the vehicle direction to be adjusted to compensate for road conditions, navigate traffic or avoid objects or other road hazards. The relatively long length of the vehicle-trailer combination makes the combination susceptible to instability when the vehicle direction is adjusted, and in particular, when the vehicle direction is adjusted abruptly or suddenly. The instability may result in undesirable weaving along the roadway. To limit vehicle instability caused by the adjustments to the moving vehicle direction, the truck is provided with a truck steering system.

The steering system may comprise a steering wheel, connected to a steering column which in turn is connected to vehicle wheels through a gear box and additional mechanical linkages. A steering control system may provide damping to the system to minimize overcompensation in response to the weather or road conditions requiring the adjustment in vehicle direction. Any resulting vehicle oscillations or weaving may be a result of the control system underdamping the steering wheel and/or steering system generally.

A steering system may provide a number of control inputs that include a driver/steering input such as a steering wheel position, acceleration and/or braking, a lateral control input for controlling or regulating yaw motion of the vehicle by acting on a steering angle of front wheels of the vehicle according to path tracking, a longitudinal control input for controlling or regulating cruise velocity of the vehicle along the path, or a mapping/perception input for controlling or regulating driving actions including acceleration, braking, and/or steering based upon inputs from a network of sensors including, but not limited to, an image sensor, radar, lidar, GPS, and so on. In general, the final control system of the steering wheel may provide underdamping to the steering system because, as the damping signals provided by the control loops and/or inputs such as a driver/steering control input, a lateral control input, a longitudinal control input, and/or a mapping or perception type input, are cascaded up to the final control system of the steering wheel, the signals do not provide the damping forces required to minimize vehicle oscillations or weaving.

Generally, cascading of control inputs where one or more control loops are underdamped may create unsafe conditions for the vehicle since the vehicle may be too slow to follow the desired path at the correct speed, which may further cause oscillations or weaving of the vehicle. The oscillations or weaving of the vehicle, such as a truck with a trailer, while unacceptable, may also pose a potential safety risk. Accordingly, a feedback control system is needed that provides the damping to the steering system required to substantially reduce or eliminate weaving and oscillations in moving vehicles such as tractor trailer combinations.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a steering control system is disclosed. The steering control system includes a steering gear box and a final steering control system. The steering gear box is communicatively coupled with the final steering control system. The final steering control system is configured to receive a plurality of critically damped outputs generated by a plurality of critically damped control loops, and generate, based on the plurality critically damped outputs, a combined critically damped output. The steering gear box is configured to receive the combined critically damped output from the final steering control system and control a steering angle of a vehicle based on the combined critically damped output.

In another aspect, a method of operating a vehicle using a steering control system that includes a steering gear box coupled with a wheel assembly and a final steering control system. The method includes generating a respective critically damped output by each control loop of a plurality of control loops, and, in accordance with the respective critically damped output from each control loop of the plurality of control loops, generating a combined critically damped output by the final steering control system to provide as an input to the steering gear box. The method includes controlling, by the steering gear box, a steering angle of the vehicle based on the combined critically damped output of the final steering control system.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Corresponding reference characters indicate corresponding parts throughout the several views of the drawings. Although specific features of various examples may be shown in some drawings and not in others, this is for convenience only. Any feature of any drawing may be reference or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The Following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention.

A semi-autonomous vehicle: A semi-autonomous vehicle is a vehicle that is able to perform some of the driving related operations such as keeping the vehicle in lane and/or parking the vehicle without human intervention.

A non-autonomous vehicle: A non-autonomous vehicle is a vehicle that is neither an autonomous vehicle nor a semi-autonomous vehicle.

A PID control loop: A PID control loop is a closed loop control system that is based upon proportional-integral-derivative (PID) control of each control variable to an optimum value to get an ideal response of the control system.

A self-tuning controlling function: A self-tuning controlling (STC) function is an algorithm used for tuning of the PID control loop automatically under changing conditions.

A lateral control system: A lateral control system controls or regulates yaw motion of the vehicle by acting on a steering angle of front wheels of the vehicle.

A longitudinal control system: A longitudinal control system controls or regulates cruise velocity or cruise speed of the vehicle along the path.

A mapping/perception control system: A mapping and/or perception control system for a non-autonomous vehicle is generally a human driver of the vehicle, who monitors the road for various road conditions including objects on the road, and other vehicles on the road. The other vehicles on the road may be vehicles parked on the road or vehicles traveling in the same or a different direction than the vehicle. The mapping and/or perception control system in the autonomous vehicle and/or the semi-autonomous vehicle may be a network of sensors and a control system providing its output to the lateral control system and/or the longitudinal control system as inputs.

As described in the present disclosure, oscillations or weaving of a truck while the truck is being driven on the roads are unacceptable as such oscillations or weaving may pose a potential safety risk. In a truck, which is being driven by a human being, the oscillations or weaving may be controlled by a driver of the truck based on a steering control input along with other controller inputs including, but not limited to, a lateral control input, a longitudinal control input, a mapping and/or a perception inputs. The inputs are cascaded (or nested) up to a final control system (or loop) of a steering wheel. The lateral control input, the longitudinal control input, the mapping and/or perception inputs, and the steering control input (based on the driver's input) may each be an input to a separate control system (or loop), and the separate control systems (or loops) are cascaded (or nested) to the final steering control system.

In the case of an autonomously driven vehicle, e.g., a truck or a car, the steering control input is not based on the driver's input. Accordingly, if any of the control loops provide an output that yields a vehicle steering system that is either overdamped or underdamped, the vehicle may experience oscillations or weaving. Accordingly, in one embodiment, each control loop that supplies output signals to the final steering control system may be a critically damped control loop so that the control system outputs serve to substantially reduce or eliminate the likelihood of vehicle oscillations or weaving. By way of a non-limiting example, each control loop may be critically damped by configuring each control loop as a PID (proportional, integral, derivative) loop and the PID loop parameters may be updated to optimum values by one or more self-tuning control (STC) functions. The final steering control system and its output is affected by other external forces including, but not limited to, road conditions, weather conditions and and/or other obstacles on the road. While these other external forces cannot be controlled or changed, these other external forces may create a need to redirect the direction traveled by the vehicle and reposition the vehicle's wheels to counteract the conditions and thereby minimize the occurrence of vehicle oscillations or weaving. In order to offset the external forces acting on the vehicle, reduce their influence or impact on the final steering control system, and ensure the final steering control system provides a signal to suitably damp the steering system's final steering control system, the final steering control system may be critically damped as a PID loop that is based on a self-tuning algorithm. The external forces are measured using one or more sensors including, but not limited to, a camera, a radar, a lidar, an anemometer, and/or an infrared sensor. The measured data may be fed as an input to the final steering control system. While these external forces are more unpredictable and may be changing at a rapid rate, the final steering control system that is a PID loop based on a self-tuning algorithm is able to adapt quickly to eliminate oscillations or weaving. A PID control loop, and a PID control loop that is tuned using an STC function are described below.

The PID control loop is described herein with regards to the longitudinal control system. PID control loops for other control systems may be similarly created. By way of a non-limiting example, the longitudinal control system may maintain a fixed reference speed suggested by the driver (for the non-autonomous vehicle) or a computing device (for the semi-autonomous vehicle and/or the autonomous vehicle). The reference speed is maintained based upon throttling commands, and/or acceleration or deceleration commands. Based upon changes in a load condition and/or a resistance condition, a throttle angle may be changed to maintain the speed to the reference speed.

For example, based upon a difference between an actual speed of the vehicle and the reference speed, a desired vehicle acceleration may be determined to reduce the difference between the actual speed of the vehicle and the reference speed. In accordance with the desired vehicle acceleration, the longitudinal control system may generate a throttle and/or a breaking actuation to adjust the actual speed to be the reference speed. The longitudinal control system as a PID controller u(t) may be based upon an error e (e.g., the difference between the actual speed of the vehicle and the reference speed), and in proportion to the proportional of the error e, the integral of the error e, and the derivative of the error e, as shown in an equation below, where $K_P$, $K_D$, and $K_I$ are constants corresponding the proportional gain, the derivative gain, and the integral gain, respectively.

$$u(t) = K_P e(t) + K_D e(t) + K_I \int_{-0}^{1} e(t)\, dt$$

The PID controller u(t) may be tuned using a self-tuning control function such that $K_P$, $K_D$, and $K_I$ constants are updated continuously for an optimum performance of the PID controller u(t). By way of a non-limiting example, the self-tuning control function may be a neural network (NN) based self-tuning control function. Additionally, or alternatively, the self-tuning control function may be based upon Zeigler-Nichols method, or other algorithms.

An output from the critically damped final steering control system (the critically damped control system or loop using a self-tuning control function) may be provided to a steering gear box. Alternatively, or additionally, the final steering control system (including other cascaded control loops) may be implemented using a computing device. By way of a non-limiting example, the computing device may be an application specific integrated circuit (ASIC), a field-programmable gate array (FPGA), a system-on-chip (SOC), a processor, and/or a digital signal processor (DSP). The computing device may be included in the steering gear box.

Figure 1:
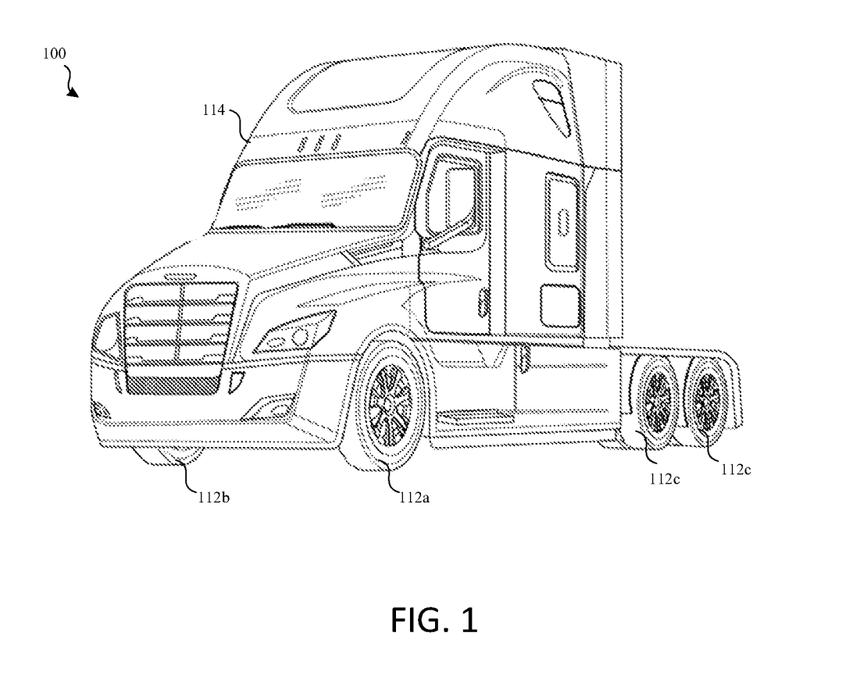
FIG. 1 is a view of a vehicle such as a truck, which includes a steering system of the present embodiment.

FIG. 1 illustrates a vehicle 100 which may include a truck that may further be conventionally connected to a single or tandem trailer to transport the trailers (not shown) to a desired location. The vehicle 100 includes a cab 114 that can be supported by, and steered in, the required direction by front wheels 112a, 112b, and rear wheels 112c that are partially shown in FIG. 1. Wheels 112a, 112b are positioned by a steering system that includes a steering wheel, a steering column, and a steering gear box (e.g., steering wheel 202, steering column 204, and steering gear box 206 as shown and described with respect to FIG. 2). The steering wheel and the steering column may be located in the interior of cab 114 and the steering gear box may be located outside of the cab 114. The steering system is in turn connected to the wheels 112a, 112b to suitably control the wheel positions.

In some embodiments, the steering column, while transmitting torque from a steering wheel, also provides an input to the steering gear box to control movement of the wheels. The input to the steering gear box may be in accordance with a position of the steering column, which is based on a position of a steering wheel. In one embodiment, a position of the steering column may be determined using a rotary encoder or a shaft encoder. By way of an example, the rotary encoder may be a digital rotary encoder. The rotary encoder may further be an absolute rotary encoder or an incremental rotary encoder and may provide its output in degrees. An output from the rotary encoder corresponding to the steering column position/orientation may be fed as an input to the steering gear box to control or move the wheels of the vehicle when the vehicle is being driven in a non-autonomous mode.

The steering gear box, in combination with other mechanical systems, controls the rotation and direction of the wheels 112a, 112b. The steering gear box is connected to a steering column and/or a wheel assembly using universal mechanical connections. The steering gear box, as described herein, may include the final steering control system that includes critically damped cascaded control loops and a self-tuning algorithm for quick adaptation to the external forces. Accordingly, the steering gear box serves to effectively control wheel rotation based on input from all sensors included in the vehicle in autonomous and non-autonomous vehicle driving modes.

In some embodiment, the steering gear box may include one or more stepper motors and screw drive mechanism to turn wheels of the vehicle. By way of a non-limiting example, two stepper motors and their respective screw drive mechanisms may be used for redundancy, which may provide dual motor assist functionality when the vehicle is being driven in an autonomous mode, a semi-autonomous mode, and/or a nonautonomous mode. In the present disclosure, a vehicle driven in an autonomous mode may be a fully autonomous vehicle and/or a semi-autonomous vehicle (while driven without human intervention).

By way of an example, servo motors (or servos) may be included in the steering gear box. However, stepper motors and their corresponding screw drive mechanisms may provide better results for a low-speed torque for steering. While the servo motors and/or stepper motors are operated or controlled using a digital control for turning wheels of the vehicle, redundant pneumatic control mechanisms may be added to the steering gear box for mechanical redundancy.

In some embodiments, communication, or exchange of data between the steering gear box and the steering column, and/or the steering gear box and wheel sensors may be in digital data format. By way of a non-limiting example, the digital communication may be according to the PROFIBUS communication standard. The PROFIBUS communication standard for digital communication with the steering gear box may be according to PROFIBUS decentralized peripherals (DP). Additionally, or alternatively, MODBUS may be used for communication with the steering gear box. In the present disclosure, data may include sensor data and/or feedback control digital data.

Various features described above are discussed in more detail below with respect to FIGS. 2, 3A, 3B, 4A, 4B, and 5.

Figure 2:
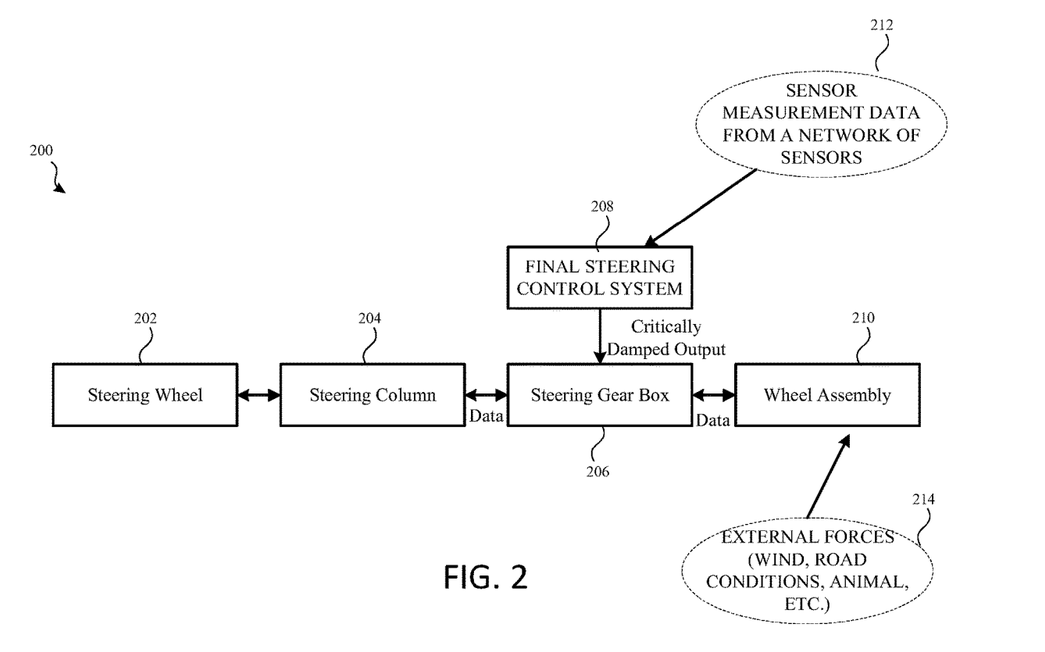
FIG. 2 is a schematic block diagram of a steering system of a vehicle according to an exemplary embodiment of the present disclosure.

FIG. 2 is a schematic block diagram of a steering system 200 for use in combination with vehicle 100 according to an exemplary embodiment. As shown in the block diagram the steering system 200 may include a steering wheel 202, a steering column 204 connected to the steering wheel, a steering gear box 206 connected to the steering column to receive output from the steering column, and a final steering control system 208 that serves to provide the required damping forces to the steering system 200. The steering system is connected or otherwise made integral with a wheel assembly 210, that comprises, among other components, wheels 112a, 112b. The final steering control system 208 may receive data 212, such as, sensor measurement data from a network of one or more sensors. The network of one or more sensors may include, but is not limited to, a camera, a radar, a lidar, an anemometer, and/or an infrared sensor. The sensor measurement data may provide data corresponding to the environment of rapidly changing driving conditions and/or other external forces (or influencing factors), shown in FIG. 2 as 214. The external forces 214 may include, for example, wind, road conditions, or animals. Measurement data corresponding to the external forces 214 may be received using the network of one or more sensors and may be used as an input to the final steering control system 208. The final steering control system 208 may be tuned using one or more self-tuning algorithms to generate a critically tuned output (or a critically damped output) to the steering gear box 206.

In some embodiments, and by way of a non-limiting example, the final steering control system 208 provides a critically damped output to the steering gear box 206 based on measurement data from the network of one or more sensors. The final steering control system 208 may include one or more controller inputs. The one or more controller inputs may include, but are not limited to, a lateral control input, a longitudinal control input, a mapping input, and/or a perception input. The one or more controller inputs may be cascaded (or nested) inputs to the final steering control system 208. Each of the one or more controller inputs may be an input to a separate control system (or a separate control loop), and an output from each respective control system (or the respective control loop) may be provided as an input to the final steering control system 208. The final steering control system 208 thus may be a cascaded control system or a cascaded control loop, which may also be referenced herein as a nested control system or a nested control loop. Each respective control system, including the final steering control system 208, may comprise a critically damped control loop and as a result substantially reduces or eliminates oscillations or weaving. The final steering control system and any other control system may be critically damped by implementing or configuring each loop as a PID loop, as described in the present disclosure. As described herein, PID loop parameters of the PID loop may be updated to optimum values by one or more STC functions.

The final steering control system 208 may be implemented using a computing device. By way of a non-limiting example, the computing device implementing the final steering control system 208 may be an ASIC, an FPGA, an SOC, a processor, and/or a DSP.

In some embodiments, a PID control generating critically damped output using STC may have an unstable first-order system with an output to be controlled, which may be represented as shown below:

pẋ−lx=u, where u is PID control and may be represented as:

$$u = K_p(r-x) + K_d(\dot{r}-\dot{x}) + K_i \int_{-0}^{t} r-x\, dt$$

By substituting for u, the system may become a second-order system, which may be represented as shown below and in which ζ=1 corresponding with a STC function such that $K_p$, $K_d$, and $K_i$ result in a system that will produce critically damped output. because the control system yields the final control output that is the same as the desired output, and, therefore, no oscillation may be observed.

$$Q\ddot{x} + 2\zeta\omega_n\dot{x} + \omega_n^2 x = \omega_n^2 r$$

The steering gear box 206 may be connected with the steering column 204 and/or the wheel assembly 210. By way of a non-limiting example, the steering gear box 206 may be connected with the wheel assembly 210 and/or the steering column 204 using universal mechanical connections. The steering gear box 206 connected with the wheel assembly 210 may control or turn the wheels using the universal mechanical connections, the steering gear box 206 may receive data (for example, measurement data from the network of one or more sensors related to road conditions) from the wheel assembly 210.

The steering gear box 206 may be connected with the steering column 204. In an autonomous vehicle, the steering column may provide input (or data) to the steering gear box 206 to control the movement of wheels 112a, 112b. The data provided from the steering column 204 to the steering gear box 206 may be in accordance with a navigational route and/or other obstacles as detected on the road using the network of one or more sensors.

In a vehicle in the non-autonomous control mode and/or in the semi-autonomous mode, the driver of the vehicle may provide his/her input to control wheel direction at the steering wheel 202 in the form of rotation of the steering wheel 202. As the steering wheel 202 is turned to control wheel direction, the steering column 204 gets rotated. The steering column 204 rotation may be transferred as an input to the steering gear box 206 using a rotary encoder or a shaft encoder.

Figure 5:
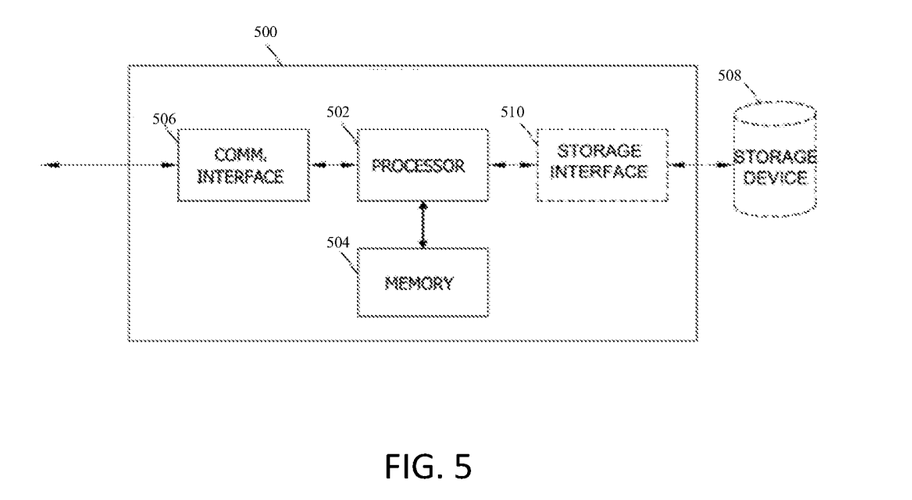
FIG. 5 is an exemplary schematic block diagram of a computing device for implementation of embodiments of the present disclosure.

Alternatively, in a vehicle in the autonomous mode, a computing device (e.g., a computing device as shown and described with respect to FIG. 5) may generate and provide an input to the steering gear box 206 to control wheel direction. Additionally, or alternatively, in a vehicle in the autonomous mode, wheel movement may be controlled based upon an input generated and provided to a stepper motor to rotate the steering column 204. The steering column 204 rotation may be transferred as an input to the steering gear box 206 using the rotary encoder or the shaft encoder.

By way of an example, the rotary encoder may be a digital rotary encoder. The rotary encoder may further be an absolute rotary encoder or an incremental rotary encoder and may provide its output in degrees. An output from the rotary encoder corresponding to the steering column's position may be fed as an input to the steering gear box to control or turn wheels of the vehicle. The steering gear box 206, as described herein, when connected to the steering column 204, may reduce oscillations or weaving, based on the critically damped output from the final steering control system 208.

In some embodiments, and by way of a non-limiting example, the final steering control system 208 and the steering gear box 206 may be integrated. The steering wheel 202 and/or the steering column 204 may be eliminated, in particular, for the autonomous vehicle. The steering gear box is described in more detail using FIGS. 3A-3B below.

Figure 3A:
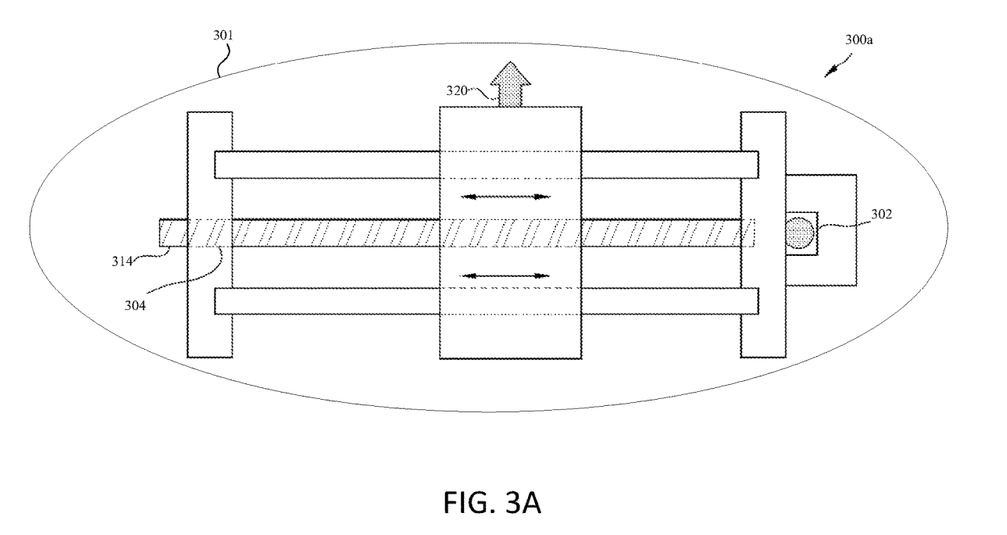
FIGS. 3A-3B illustrate exemplary views of a part of the steering gear box of FIG. 2 according to exemplary embodiments of the present disclosure.
Figure 3B:
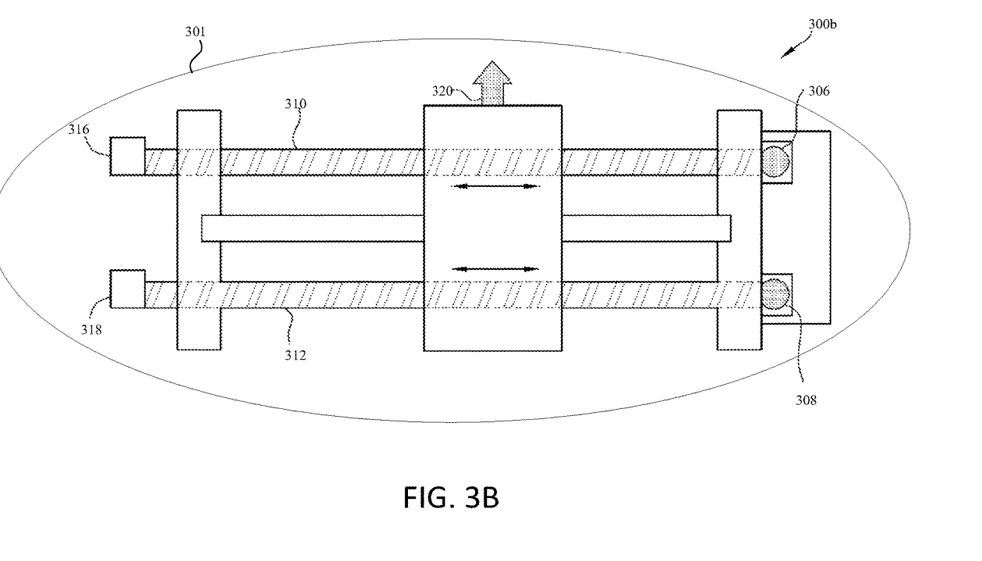

FIGS. 3A-3B illustrate exemplary views 300a-300b of a part of a steering gear box 301 (e.g., a steering gear box 206 of FIG. 2) according to exemplary embodiments of the present disclosure.

As shown in the view 300a, the steering gear box 301 may include a stepper motor 302 and a screw drive mechanism 304 to reposition or reorient wheels of the vehicle. Alternatively, or additionally, as shown in the view 300b, two stepper motors 306 and 308 and their respective screw drive mechanisms 310 and 312 may be used for redundancy. By way of an example, the steering gear box 301 including two stepper motors 306 and 308 and their respective screw drive mechanisms 310 and 312 may provide a dual motor assist functionality when the vehicle is being driven in an autonomous mode and/or a nonautonomous mode. By way of an example, one or two servo motors (or servos) may be included in the steering gear box 301 instead of the one or two stepper motors. However, stepper motors and their corresponding screw drive mechanisms may provide better results for a low-speed torque for steering. While the servo motors and/or stepper motors are operated or controlled using a digital control for turning the wheels of the vehicle using a rack and pinion connection 320, one or more redundant pneumatic control mechanisms, for example, as shown in the view 300a as 314, and/or as shown in the view 300b as 316 and 318 may be added to the steering gear box for mechanical redundancy.

Figure 4A:
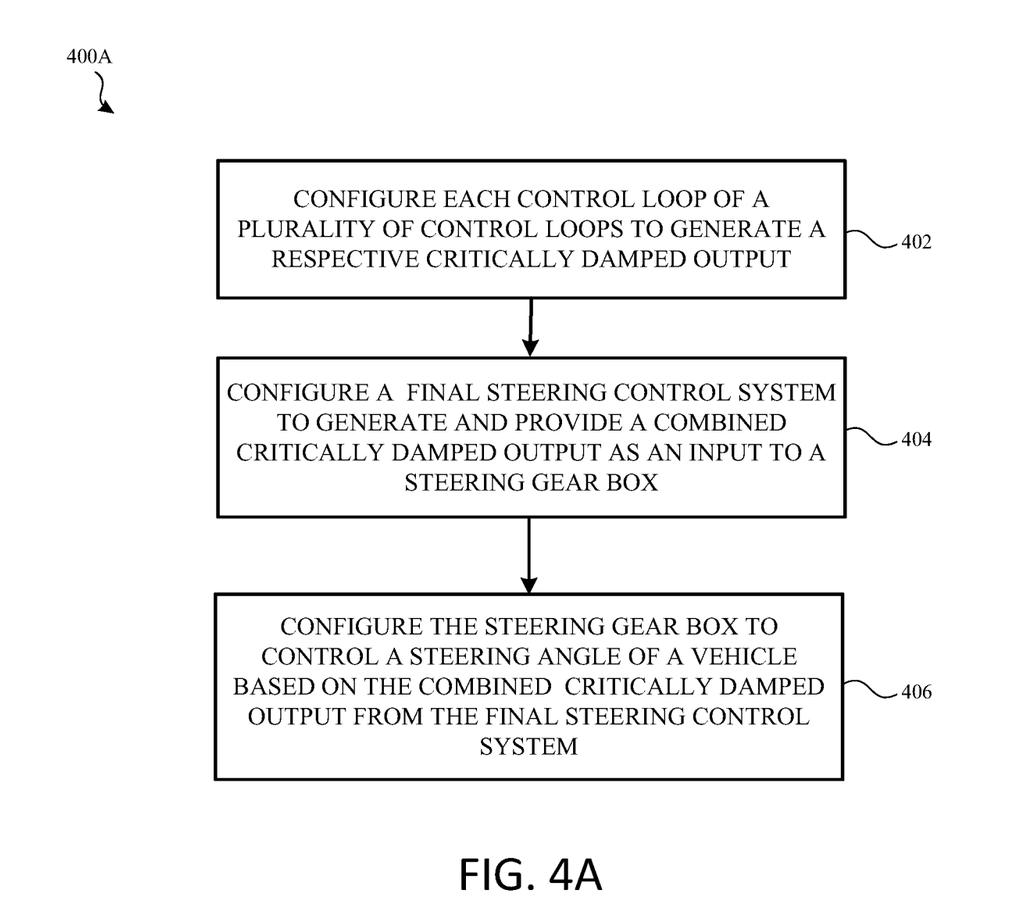
FIG. 4A is a flow-chart of method operations for making or assembling a steering control system according to an exemplary embodiment of the present disclosure.

FIG. 4A illustrates a flow-chart 400a of method operations for making or assembling a steering control system (e.g., the steering system 200 as shown and described with respect to FIG. 2) according to an exemplary embodiment of the present disclosure. The steering control system may include a steering gear box, a wheel assembly, and a final steering control system. The steering gear box may be connected with the wheel assembly using universal mechanical connections. As described herein, each control loop of a plurality of control loops (e.g., a lateral control loop, a longitudinal control loop, and so on) may be configured (402) to generate a respective critically damped output as an input to the final steering control system. The respective critically damped output from each control loop may be an input to a final steering control system, which is nested or cascaded with the plurality of control loops. The final steering control system may be configured (404) to generate, based on the respective critically damped output from each control loop of the plurality of control loops, a combined critically damped output, and provide the generated combined critically damped output as an input to the steering gear box. Each control loop, including the final steering control system (or the final steering control loop) may be implemented as a PID loop. Additionally, or alternatively, PID loop parameters of the one or more PID loops may be updated to optimum values using one or more self-tuning algorithms.

The steering gear box coupled with the final steering control system and may receive the combined critically damped output as an input to the steering gear box. The steering gear box may be configured (406) to control a steering angle of a vehicle based on the combined critically damped output from the final steering control system that is received as an input the steering gear box. The steering gear box receiving the combined critically damped output from the final steering control system and coupled with the wheel assembly using the universal mechanical connections may be configured or adapted to turn, or control wheel direction of, at least one wheel of the wheel assembly. The steering gear box may include at least one stepper motor (or at least one servo motor) and a corresponding screw drive mechanism. Additionally, or alternatively, the steering gear box may include at least one pneumatic control mechanism for mechanical redundancy.

In some embodiments, the steering gear box may be coupled with a steering column that is further coupled with a steering wheel. The steering wheel may be adapted to receive an input to control movement of the at least one wheel of the wheel assembly from a driver of a vehicle, when the vehicle is being driven in a non-autonomous mode. The steering gear box may be configured or adapted to receive an input corresponding to a position of the steering column using a rotary encoder (e.g., a digital rotary encoder). The position of the steering column corresponds with a position of the steering wheel.

In some embodiments, the steering column may be coupled with a steering wheel, and the steering wheel may be adapted to receive an input to control movement, or direction, of at least one wheel of the wheel assembly from a controller of a vehicle being driven in an autonomous mode. The steering gear box may be configured or adapted to receive an input corresponding to a position of the steering column using a rotary encoder (e.g., a digital rotary encoder). The position of the steering column may correspond with a position determined by the controller of the vehicle, based at least in part upon a route guidance.

Figure 4B:
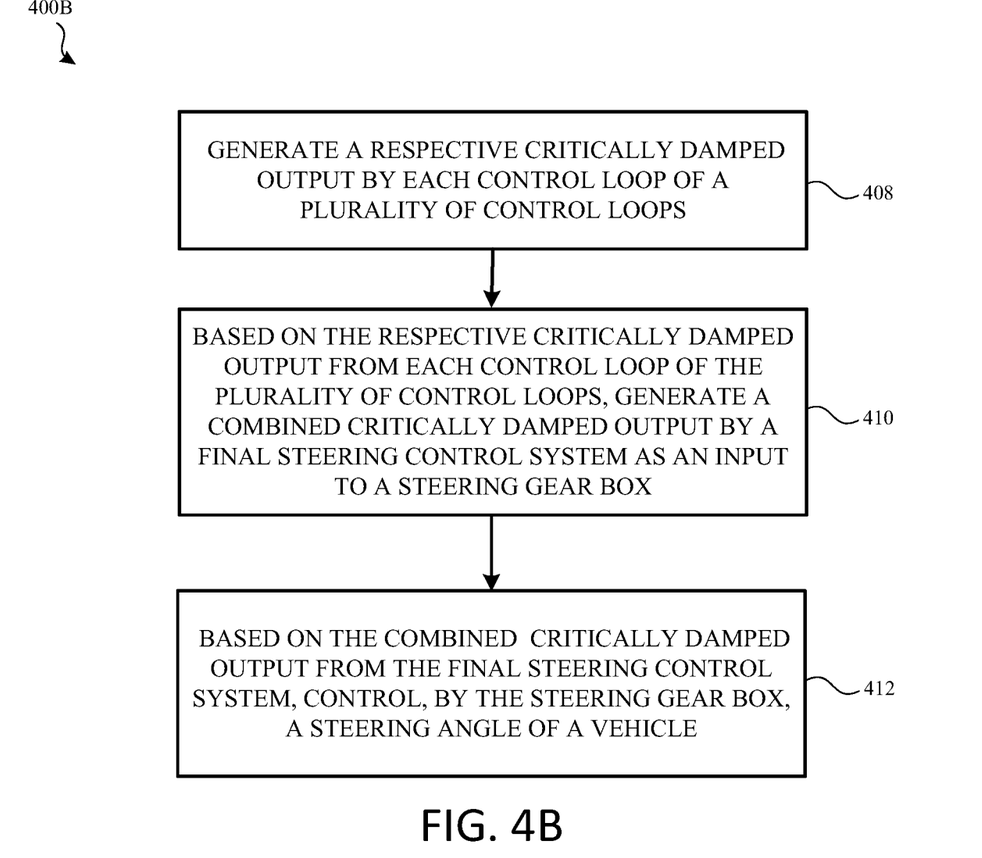
FIG. 4B is a flow-chart of method operations for operating a vehicle using a steering control system according to an exemplary embodiment of the present disclosure.

FIG. 4B illustrates a flow-chart 400b of method operations for operating a vehicle using a steering control system (e.g., the steering system 200 as shown and described with respect to FIG. 2) according to an exemplary embodiment of the present disclosure. The steering control system may include a steering gear box, a wheel assembly, and a final steering control system. The steering gear box may be coupled or connected with the wheel assembly using universal mechanical connections. The steering gear box may be coupled with the final steering control system. As described herein, each control loop of a plurality of control loops (e.g., a lateral control loop, a longitudinal control loop) may generate (408) a respective critically damped output as an input to the final steering control system. The respective critically damped output from each control loop may be an input to a final steering control system, which is nested or cascaded with the plurality of control loops. The final steering control system may generate (410), based on the respective critically damped output from each control loop of the plurality of control loops, a combined critically damped output, and provide the generated combined critically damped output as an input to the steering gear box. Each control loop, including the final steering control system (or the final steering control loop) may be implemented as a PID loop. Additionally, or alternatively, PID loop parameters of the one or more PID loops may be updated to optimum values using one or more self-tuning algorithms.

The steering gear box coupled with the final steering control system may receive the combined critically damped output as an input to the steering gear box. The steering gear box may control (412) a steering angle of a vehicle based on the combined critically damped output from the final steering control system that is received as an input the steering gear box. The steering gear box receiving the combined critically damped output from the final steering control system and coupled with the wheel assembly using the universal mechanical connections may be configured or adapted to turn, or control wheel direction of, at least one wheel of the wheel assembly. The steering gear box may include at least one stepper motor (or at least one servo motor) and a corresponding screw drive mechanism. Additionally, or alternatively, the steering gear box may include at least one pneumatic control mechanism for mechanical redundancy.

FIG. 5 is an exemplary schematic block diagram of a computing device 500 for implementation of embodiments of the present disclosure. The computing device 500 may include one or more processing units or processors 502 (e.g., in a multi-core configuration). Processor 502 may be operatively coupled to a communication interface 506 such that the computing device 500 is capable of communicating with another device, such as a remote application server, a user equipment, and/or another computing device, for example, using wireless communication or data transmission over one or more radio links or digital communication channels.

Processor 502 may also be operatively coupled to a storage device 508. Storage device 508 may be any computer-operated hardware suitable for storing and/or retrieving data, such as, but not limited to, data associated with historic databases. In some embodiments, storage device 508 may be integrated in the computing device 500. For example, the computing device 500 may include one or more hard disk drives as storage device 508.

In other embodiments, storage device 508 may be external to the computing device 500 and may be accessed by a using a storage interface 510. For example, storage device 508 may include a storage area network (SAN), a network attached storage (NAS) system, and/or multiple storage units such as hard disks and/or solid-state disks in a redundant array of inexpensive disks (RAID) configuration.

In some embodiments, processor 502 may be operatively coupled to storage device 508 via the storage interface 510. Storage interface 510 may be any component capable of providing processor 502 with access to storage device 508. Storage interface 510 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 502 with access to storage device 508.

Processor 502 may execute computer-executable instructions for implementing aspects of the disclosure. In some embodiments, the processor 502 may be transformed into a special purpose microprocessor by executing computer-executable instructions or by otherwise being programmed. In some embodiments, and by way of a non-limiting example, the memory 404 may include instructions to perform specific operations, as described herein.

An example technical effect of the methods, systems, and apparatus described herein includes substantial reductions or eliminations of oscillations and/or weaving since the final steering control system that is a critically damped loop using a self-tuning control algorithm.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processors, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms such as processor, processing device, and related terms.

In the embodiments described herein, memory may include, but is not limited to, a non-transitory computer-readable medium, such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A steering control system for an autonomous vehicle, the steering control system comprising:
    a final steering control system configured to:
        receive a plurality of critically damped outputs generated by a plurality of critically damped control loops, wherein each control loop of the plurality of critically damped control loops is configured to generate the respective critically damped output based on a respective input corresponding to a measurement of one or more external forces using at least one sensor, each external force having a respective likelihood to impact movement of the autonomous vehicle; and
        generate, based on the plurality of critically damped outputs, a critically damped output control signal; and
    a steering gear box communicatively coupled with the final steering control system and configured to:
        receive the critically damped output control signal from the final steering control system; and
        control a steering angle of the autonomous vehicle based on the critically damped output control signal.

2. The steering control system of claim 1, wherein each control loop of the plurality of critically damped control loops is implemented as a PID (proportional, integral, derivative) loop.

3. The steering control system of claim 1, wherein the final steering control system is implemented as a PID (proportional, integral, derivative) loop and configured to update PID loop parameters using a self-tuning control algorithm.

4. The steering control system of claim 1, wherein the steering gear box includes at least one stepper motor and corresponding screw drive mechanism adapted to turn at least one wheel through a wheel assembly.

5. The steering control system of claim 4, wherein the steering gear box further includes at least one pneumatic control mechanism.

6. The steering control system of claim 1, wherein the steering gear box is coupled with a steering column.

7. The steering control system of claim 6, wherein:
    the steering column is coupled with a steering wheel adapted to receive an input to control direction of at least one wheel of a wheel assembly from an operator of the autonomous vehicle while the autonomous vehicle is operated in a non-autonomous mode; and
    the steering gear box is adapted to receive an input corresponding to a position of the steering column using a rotary encoder, the position of the steering column is in accordance with a position of the steering wheel.

8. The steering control system of claim 7, wherein the rotary encoder is digital rotary encoder.

9. The steering control system of claim 6, wherein:
    the steering column is coupled with a steering wheel adapted to receive an input to control direction of at least one wheel of a wheel assembly from a controller of the autonomous vehicle while the autonomous vehicle is operated in an autonomous mode; and
    the steering gear box is adapted to receive an input corresponding to a position of the steering column using a rotary encoder, the position of the steering column is in accordance with a position determined by the controller of the autonomous vehicle.

10. A method of operating an autonomous vehicle using a steering control system comprising a steering gear box coupled with a wheel assembly and a final steering control system, the method comprising:
    generating a respective critically damped output by each control loop of a plurality of control loops based on a respective input corresponding to a measurement of one or more external forces using at least one sensor, each external force having a respective likelihood to impact movement of the autonomous vehicle;
    based on the respective critically damped output from each control loop of the plurality of control loops, generating, by the final steering control system, a critically damped output control signal;
    providing, by the final steering control system, the critically damped output control signal as an input to the steering gear box; and
    controlling, by the steering gear box, a steering angle of the autonomous vehicle based on the critically damped output control signal.

11. The method of claim 10, wherein each control loop of the plurality of control loop is implemented as a PID (proportional, integral, derivative) loop.

12. The method of claim 10, wherein:
    the critically damped output control signal by the final steering control system is generated by the final steering control system implemented as a PID (proportional, integral, derivative) loop; and
    PID loop parameters of the final steering control system are updated using a self-tuning control algorithm.

13. The method of claim 10, wherein the controlling the steering angle of the autonomous vehicle based on the critically damped output control signal comprises controlling the steering angle of the autonomous vehicle using the steering gear box including at least one stepper motor and a corresponding screw drive mechanism.

14. The method of claim 10, wherein the steering gear box further includes at least one pneumatic control mechanism.

15. The method of claim 10, wherein the steering gear box is coupled with a steering column.

16. The method of claim 15, further comprising:
    receiving an input to control direction of at least one wheel of the wheel assembly from an operator of the autonomous vehicle while the autonomous vehicle is operated in a non-autonomous mode; and
    receiving, at the steering gear box, an input corresponding to a position of the steering column using a rotary encoder, the position of the steering column is in accordance with a position of the steering wheel.

17. The method of claim 16, wherein the rotary encoder is digital rotary encoder.

18. The method of claim 15, further comprising:
    receiving an input to control direction of at least one wheel of the wheel assembly from a controller of the autonomous vehicle while the autonomous vehicle is operated in an autonomous mode; and
    receiving, at the steering gear box, an input corresponding to a position of the steering column using a rotary encoder, the position of the steering column is in accordance with a position determined by the controller of the autonomous vehicle.

* * * * *